United States Patent [19]

Yanagida

[11] Patent Number: 4,495,530
[45] Date of Patent: Jan. 22, 1985

[54] METHOD OF PROCESSING INFORMATION SIGNAL WITH RESPECT TO OPTO-MAGNETIC RECORD MEDIUM

[75] Inventor: Tuneo Yanagida, Hino, Japan
[73] Assignee: Olympus Optical Co. Ltd., Japan
[21] Appl. No.: 324,764
[22] Filed: Nov. 25, 1981

[30] Foreign Application Priority Data

Nov. 26, 1980 [JP] Japan .............................. 55-165322

[51] Int. Cl.$^3$ ............................................. G11B 5/02
[52] U.S. Cl. ....................................................... 360/59
[58] Field of Search .......................... 360/59, 114, 66; 369/100; 365/215, 218

[56] References Cited

U.S. PATENT DOCUMENTS 3,631,415 12/1971 Asgard .................................... 360/59

Primary Examiner—Vincent P. Canney
Attorney, Agent, or Firm—Parkhurst & Oliff

[57] ABSTRACT

In an opto-magnetic apparatus using an opto-magnetic record disc which has been uniformly magnetized in one direction perpendicular to a surface of the disc, an information signal recorded in the disc along a track is erased by irradiating the track to be erased with a laser light beam to heat the relevant track to a Curie point and by applying an external erasing magnetic field having a direction opposite to that of the uniform magnetization in the disc so as to magnetize the track in the other direction. In case of re-recording an information signal in the thus erased track, the information signal is first inverted and then the laser beam is modulated with the inverted information signal and the modulated laser beam is projected upon the erased track, while an external magnetic field having the same direction as that of the uniform magnetization in the disc is applied. The information signal may be alternatively recorded in the erased track without inverting the information signal together with an identifying signal denoting that the recorded information signal has a magnetization of the same direction as that of the uniform magnetizaton.

16 Claims, 18 Drawing Figures

METHOD OF PROCESSING INFORMATION SIGNAL WITH RESPECT TO OPTO-MAGNETIC RECORD MEDIUM

BACKGROUND OF THE INVENTION

The present invention generally relates to technique for recording, reproducing and erasing an information signal with respect to an opto-magnetic recording medium.

Nowadays, there has been developed an apparatus in which information can be recorded on and read out of a recording medium by means of a laser beam, said recording medium being formed by a magnetic film of two-phase amorphous alloy such as GdCo, GdFe, TbFe and DyFe and three-phase amorphous alloy such as GdTbFe. In the case of recording, the magnetic film has been previously magnetized perpendicularly, for instance downward and the laser beam modulated with an information signal to be recorded is projected onto a given portion of the film so as to heat the related portion near a Curie point while the related portion is subjected to an external biassing magnetic field directing upward. Then the direction of magnetization in the relevant portion is inverted. Since the information can be recorded perpendicularly in the magnetic film a very high recording density can be attained. In case of reproducing the information thus recorded in the recording medium, the laser beam is projected via a polarizer onto the medium and the reflected or transmitted laser beam is received by a photodetector via an analyzer. The polarization surface of the linearly polarized laser beam is rotated to some extent due to a magnetic Kerr effect or a magnetic Faraday effect in a direction depending upon the direction of magnetization at the read out portion of the recording medium. By detecting the rotational direction of the polarization plane of the detected laser beam, the information can be read out. In such an opto-magnetic recording medium, not only the recording and reproducing, but also erasing can be effected and thus, the information can be rewritten on ordinary magnetic recording medium such as magnetic tape, magnetic disc and floppy disc.

FIG. 1 is a schematic view showing a known recording and reproducing apparatus using the above mentioned opto-magnetic recording medium. In the case of recording an information signal, a laser beam emitted from a laser light source 1 such as an Ar laser device is modulated in a modulator 2 with the information signal to be recorded. The modulated laser beam is projected by means of half mirrors 3 and 4, a polarizer 5, a lens 6, a mirror 7 and a fly eye lens 8 onto an opto-magnetic disc 10 as a small light spot. The disc 10 comprising a disc shaped MnBi film is rotatably supported by an air bearing 9 and is rotated at a high speed. A part of the modulated laser beam divided by the half mirror 3 is received by a photodetector 11 and an output power of the laser beam from the laser device 1 is controlled in accordance with an output from the photodetector 11. In this manner the information signal can be recorded along concentrical tracks or a spiral track.

In order to detect a position of the recorded information on the disc 10, a laser beam emitted from a laser light source 12 such as He-Ne laser device is projected by means of a mirror 13, a half mirror 14 and a lens 15 onto the same track on the disc 10 as that on which the information signal has been just recorded, and the laser beam reflected by the disc is received by a photodetector 16 via the lens 15 and the half mirror 14.

As described above, the recording of the information signal on the opto-magnetic disc 10 is effected by irradiating a relevant portion of the disc with the modulated laser beam to heat the related portion near the Curie point and the direction of magnetization of the relevant portion is inversed by externally applied biasing magnetic field. FIGS. 2A to 2C show schematically how to record the information signal on the disc. Prior to the recording, a magnetic film 21 of the disc 10 is uniformly magnetized in a direction shown by arrows in FIG. 2A, i.e. upward. When the laser beam 22 is projected onto a given restricted portion 23 of the film 21, the irradiated portion 23 is locally heated. When a temperature $T_M$ of the irradiated portion 23 is increased higher than the Curie point $T_C$, the portion 23 becomes a paramagnetic condition and the magnetization in the relevant portion is forcedly oriented in a direction of a demagnetizing field Hin produced by adjacent portions of the film 21. Under such a condition, when an external magnetic field Hex having the same direction as the demagnetizing field Hin is applied to the film 21, the relevant portion 23 is magnetized in the direction opposite to that of the uniform magnetization after the temperature $T_M$ of the portion 23 is decreased sufficiently lower than the Curie point $T_C$ as illustrated in FIG. 2C. Since the heated portion 23 is under the paramagnetic condition, the external magnetic field Hex may be sufficiently lower than a coercive force Hc of the magnetic film 21. Further, if the film 21 has a large saturation magnetization, the external magnetic field Hex may be omitted. Such a small external magnetic field Hex does not affect the magnetization of the magnetic film 21 except for the relevant portion 23. It is one of the important merits of the opto-magnetic recording that the magnetization can be inverted by the weak external magnetic field.

In order to reproduce the information recorded in the opto-magnetic disc 10 in the apparatus shown in FIG. 1, the laser beam emitted from the laser light source 1 is focussed on the disc 10 and the reflected light is received via a half mirror 25 and a polarizing prism 26 by photodetectors 27A and 27B. The information signal can be regenerated by supplying output signals from the photodetectors 27A and 27B to a differential amplifier 28.

A light beam reflected by the half mirror 25 is received by a photodetector 29 which produces a signal representing the position of the laser beam spot on the opto-magnetic disc 10.

In the opto-magnetic apparatus shown in FIG. 1, in order to erase the information once recorded on the opto-magnetic disc 10, a laser beam 22' is projected on a portion 23' of the magnetic film 21 in which portion the information signal to be erased has been recorded and at the same time an external magnetic field Hex having a magnitude greater than the demagnetizing field Hin and a direction opposite to the demagnetizing field Hin is applied as illustrated in FIG. 3A. When the portion 23' is heated higher than the Curie point $T_C$, the magnetization in the portion 23' is forcedly inverted in the same direction as that in adjacent portions. After the temperature of the portion 23' is decreased, the magnetization in the relevant portion 23' is reversed in the same as that in the adjacent portions and in this manner the information can be erased as shown in FIG. 3B. The magnetic film 21 is made of MnBi, CoP, etc. having a very large saturation magnetization. For instance, MnBi and CoP have the saturation magnetization represented by 4πMs up to about 7,000 and 17,000 Gausses. Therefore, the amount of the external magnetic field Hex for erasing should be correspondingly large and this causes practical problem.

As described above, the information signal is recorded along the track on the opto-magnetic disc and thus, in order to position accurately the light beam spot on the track, focussing and tracking servo mechanisms must be provided. However, when the erasing is effected by orientating the magnetization into the same direction as that in adjacent regions, the track has been completely erased and thus a given tracking signal could not be obtained during a next recording. It should be noted that in case of re-recording, the disc must be erased partially and new information is recorded in the erased portion. Therefore, if the track is completely erased and any tracking error signal could not be derived from the erased portion, an accurate re-recording could not be effected.

SUMMARY OF THE INVENTION

The present invention has for its object to provide a novel and useful method of processing an information signal with respect to an opto-magnetic record medium, in which a tracking error signal can be always obtained effectively and thus re-recording can be effected precisely under the control of the tracking signal.

It is another object of the invention to provide a method for erasing an information signal recorded in the opto-magnetic record medium, in which the track does not completely disappear and track information can still be obtained.

According to the invention, in a method of processing an information signal with respect to an opto-magnetic record medium which has an easily magnetizable axis perpendicular to its surface and has been uniformly magnetized in one direction, in order to erase the information signal which has been recorded in the record medium along one or more tracks by inverting a direction of magnetization in accordance with the information signal, the method comprises heating at least a part of the track containing the information signal to be erased by irradiating the relevant portion with a light beam to a temperature at which the relevant portion becomes substantially in a paramagnetic condition; and applying to the relevant portion an erasing magnetic field having such a direction that the relevant portion is magnetized in the other direction so as to erase the information signal in the relevant portion of the track.

DESCRIPTION OF THE PREFERRED EMBODIMENTS

Figure 1:
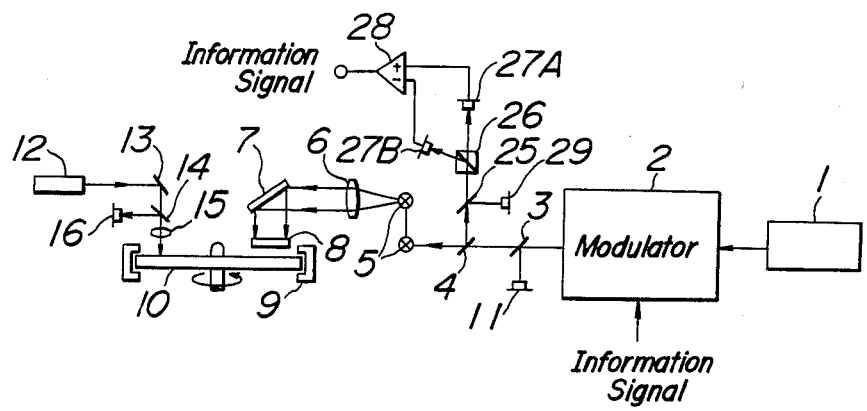
FIG. 1 is a schematic view showing an embodiment of a known information recording and reproducing apparatus using an opto-magnetic record medium.
Figures 2A, 2B, 2C:
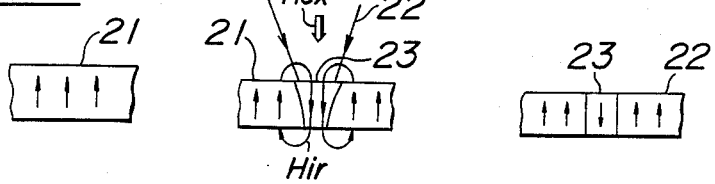
FIGS. 2A, 2B and 2C are schematic views explaining a manner of recording an information signal in the known apparatus.
Figures 3A, 3B:
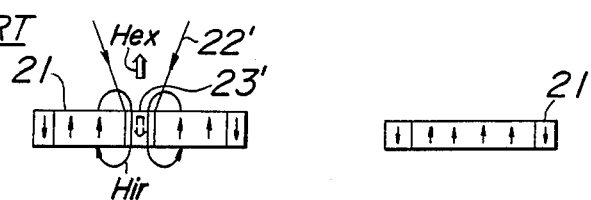
FIGS. 3A and 3B are schematic views explaining a manner of erasing the information signal in the known apparatus.
Figure 4:
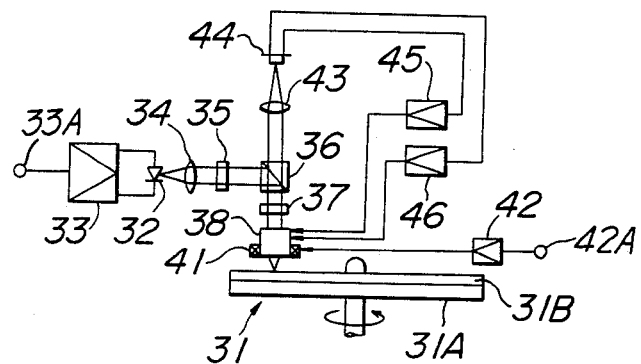
FIG. 4 is a schematic view showing an embodiment of an opto-magnetic apparatus for carrying out the method according to the invention.
Figure 5:
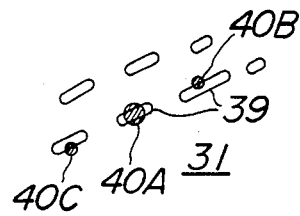
FIG. 5 is a plan view depicting a positional relation between three beam spots and a track on a record medium.

FIG. 4 is a schematic view showing an embodiment of a recording and reproducing apparatus using an opto-magnetic record medium according to the invention. In the present embodiment, the recording, reproducing and erasing are effected by projecting a laser beam emitted from a semiconductor laser 32 onto an opto-magnetic record medium 31 which is rotated or moved relative to the laser beam. The semiconductor laser 32 is driven by a laser driving circuit 33. The laser beam emitted by the semiconductor laser 32 is collimated by a collimator lens 34 and a parallel beam is divided by a grating 35 into three beams which are then projected on the record medium 31 by means of a polarizing beam splitter 36, a quarter wavelength plate 37 and a pick-up 38. The record medium 31 comprises a substrate 31A and a magnetic film 31B applied on the substrate. The magnetic film 31B may be made of magnetic material having a saturation magnetization represented by 4πMs equal to or smaller than about 1,000 Oe and having an easily magnetizable axis perpendicular to the film surface. The magnetic material has preferably a large Kerr rotation angle or polar Kerr effect. Such magnetic material may be an amorphous thin film of rare earth element-iron group transition metals such as TbFe and DyFe. The pick-up 38 comprises an objective lens for projecting three light spots on the record medium 31, a focussing mechanism for displacing the objective lens in a direction of its optical axis and a tracking mechanism for moving the objective lens in a direction perpendicular to the optical axis as well as to a track direction. As illustrated in FIG. 5, the three light spots 40A, 40B and 40C on the record medium 31 are separated in the track direction as well as in a direction perpendicular to the track direction. That is to say, the central light spot 40A (recording, reproducing, erasing and focussing light spot) is situated on a center of information pits 39, whereas the remaining spots 40B and 40C are positioned on opposite edges of the pits, respectively. The pick-up 38 further comprises an electromagnet 41 generating the external magnetic field Hex and the electromagnet 41 is energized by magnet driving circuit 42.

The three beams reflected by the record medium 31 are collected by the pick-up 38, transmitted through the quarter wavelength plate 37 and polarizing beam splitter 36 and are made incident upon a cylindrical lens 43. The cross sectional configuration of the beams are converted in accordance with the focussing error. Then, the beams are received by a photodetector 44. From the central beam corresponding to the central spot 40A, an information signal and a focussing error signal can be derived and a tracking error signal can be derived from the remaining two beams corresponding to the spots 40B and 40C in FIG. 5. The technique of deriving the information, focussing and tracking error signals from the three beams has been well known in optical disc players such as a video disc player. The focussing error signal is suitably processed in a focussing servo circuit 45 and the focussing servo mechanism in the pick-up 38 is controlled by an output from the focussing servo circuit 45 so that a focal point of the objective lens is always maintained on the opto-magnetic record medium 31. The tracking error signal is supplied through a tracking servo circuit 46 to the tracking mechanism in the pick-up 38 so as to move the objective lens in the direction perpendicular to the track and the central beam spot 40A is always positioned at the center of the pits 39, i.e. the track.

In the opto-magnetic apparatus shown in FIG. 4, the erasing and recording may be effected by supplying a constant driving current to the laser driving circuit 33 from an input terminal 33A to emit the laser beam of a constant intensity from the laser 32 and by applying an information signal to the electromagnet driving circuit 42 from an input terminal 42A to modulate the external magnetic field. Such a recording method has been practically applied in the magnetic disc recorder and may be considered to be similar to so-called over-write method. However, in such a method, in order to obtain the external magnetic field of several hundreds Oersteds, the number of turns of a coil of the electromagnet 41 has to be increased. Therefore, an inductance of the coil becomes several hundred micro Henries and a driving frequency of the electromagnet 41 is restricted only to several tens killo Hertz. Therefore, the erasing and recording could not be carried out at a high speed.

In order to avoid the above drawback, according to the invention, the erasing signal or the information signal is supplied to the input terminal 33A and the constant driving current is supplied to the input terminal 42A in dependence upon the erasing and recording.

Now the erasing and recording operation in the apparatus illustrated in FIG. 4 will be explained.

Figure 6A:
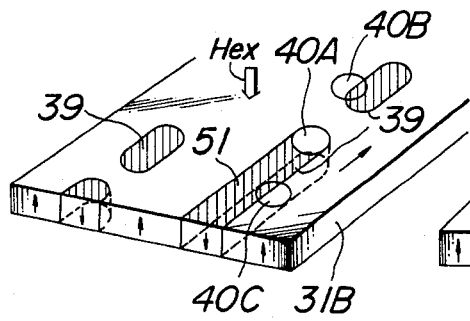
FIGS. 6A and 6B are schematical perspective view showing a manner of erasing and recording the information according to the invention.
Figure 7A:
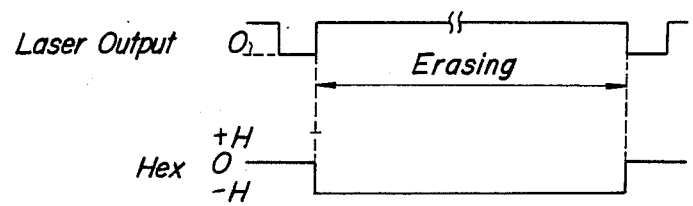
FIGS. 7A and 7B are schematic views showing a relation between a laser output and an external magnetic field in case of initial recording and re-recording, respectively.

FIG. 6A shows a manner of erasing the information. According to the invention, a track 51 to be erased is magnetized in a direction opposite to that of surrounding portions. The track 51 is irradiated with the beam spot 40A and is heated higher than the Curie point $T_C$. At the same time, an external magnetic field Hex having a direction opposite to the direction of magnetization in the surrounding portion is applied to the magnetic film 31B. Then an effective magnetic field Heff applied to the relevant track 51 is a sum of the external magnetic field Hex and the demagnetizing field Hin generated by the magnetization in the surrounding portions of the magnetic film 31B. Therefore, the track 51 is wholly magnetized in the direction (downward in FIG. 6A) opposite to that in the surrounding portions. In this manner, the information is erased. FIG. 7A shows a relation between the laser output and the external magnetic field Hex during the erasing.

Figure 6B:
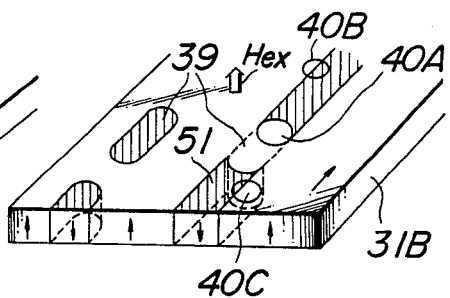
Figure 7B:
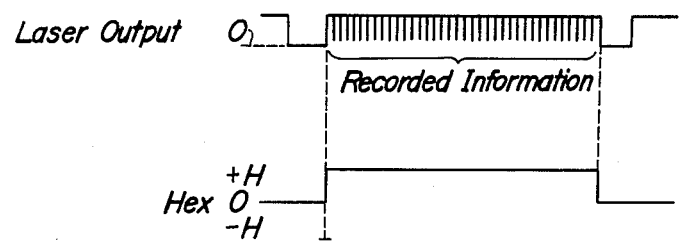
Figure 8A:
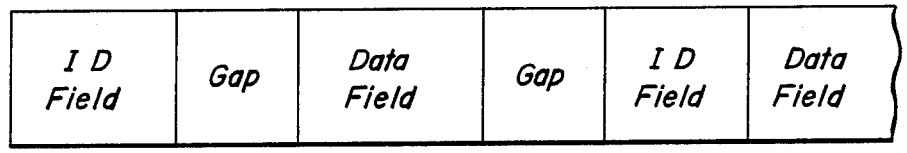
FIGS. 8A and 8B are diagrams illustrating two embodiments of a recording format according to the invention.
Figure 8B:
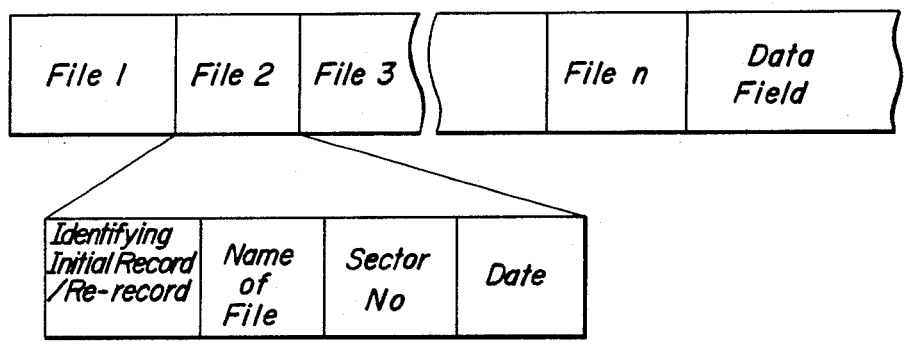

FIG. 6B illustrates a manner of recording the information on the erased track 51. In this case an external magnetic field Hex having a direction opposite to that used for erasing and an amount smaller than the coercive force Hc, but larger than the demagnetizing magnetic field Hin is applied. At the same time, the laser beam modulated with the information signal to be recorded is projected on the record medium along the track 51. Then at an irradiated portion in the track 51 there is obtained a residual magnetization having a direction the same as that of the magnetization in surrounding portions. FIG. 7B illustrates a relation between the laser output and the external magnetic field Hex during the recording. When the laser beam is modulated by the information signal in the same manner both for the initial recording and the re-recording, the direction of the magnetization corresponding to the information signal, i.e. pits 39 becomes opposite to each other for the initial recording and the re-recording as shown in FIG. 6B. Therefore, any indication for identifying the recording mode should be recorded during the re-recording. In order to identify the recording mode, various measures may be adopted by taking into account the fact that a single track on the record medium is divided into several sectors. FIG. 8A shows an embodiment of a recording format. In this embodiment, there is provided an ID field of one byte at a front portion of a data field and in this ID field is recorded an identifying signal such as "FF" (" " denotes sexadecimal digit). At a time of re-recording, the ID field is first read-out and when the "FF" has been set in this ID field, the information signal is inverted and then is re-corded. FIG. 8B shows another embodiment of the record format in which n tracks have been retained as a file index and a record identifying regions are provided in each file index. During the re-recording, the information signal is recorded as it is and during the reproduction the reproduced signal is inverted in accordance with the identifying information recorded in the record identifying regions.

Figure 9:
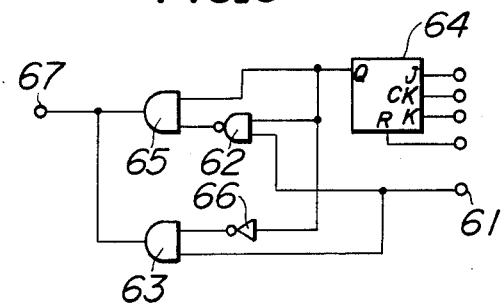
FIG. 9 is a circuit diagram showing one embodiment of a writing-in circuit.
Figure 10A:
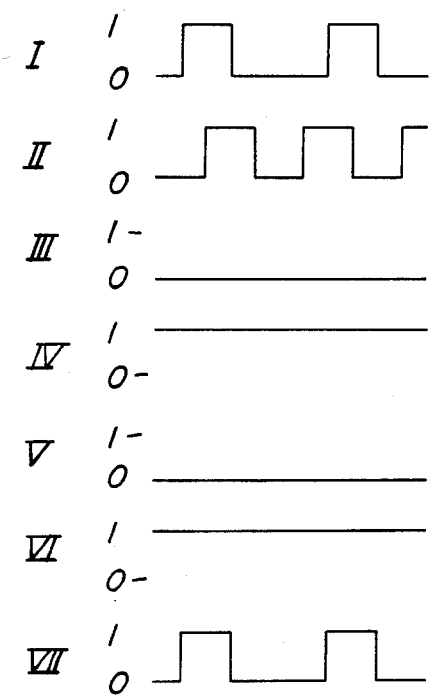
FIGS. 10A and 10B are signal waveforms explaining an operation of the writing-in circuit of FIG. 9.
Figure 10B:
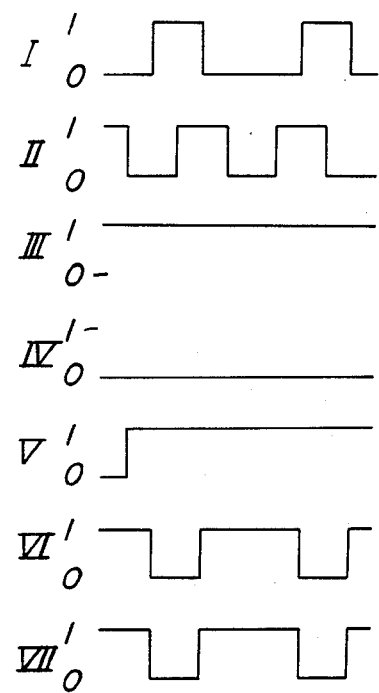

FIG. 9 is a circuit diagram of an embodiment of an information recording circuit according to the invention. To an input terminal 61 is supplied an initial recording information signal shown in FIG. 10A-I or a re-recording information signal shown in FIG. 10B-I. The information signal to be recorded is supplied to one input of NAND gate 62 and AND gate 63. To a clock input CK of a J-K flip-flop 64 is supplied a clock signal shown in FIGS. 10A-II and 10B-II. In case of initial recording a logic signal "0" shown in FIG. 10A-III is supplied to a J-input of the flip-flop 64, whereas in case of re-recording a logic "1" shown in FIG. 10B-III is supplied to the J-input of flip-flop 64. Further, to a K-input of the flip-flop 64, a logic "1" signal and a logic "0" signal shown in FIGS. 10A-IV and 10B-IV are supplied in the case of the initial recording and re-recording, respectively. Then, in the case of the initial recording there is obtained a logic "0" signal at a Q-output of the flip-flop 64 and in the case of the re-recording a logic "1" signal is obtained as illustrated in FIGS. 10A-V and 10B-V, respectively. The output signal at the Q-output is supplied to the other input of the NAND gate 62 and to one input of an AND gate 65 as well as to the other input of the AND gate 63 through an inverter 66. An output from the NAND gate 62 is supplied to the other input of the AND gate 65. The outputs from the AND gates 63 and 65 are supplied to an output terminal 67 through a wired-OR gate. The signal at the output terminal 67 may be supplied to the input terminal 33A of the opto-magnetic apparatus as the laser driving signal.

By means of the above mentioned recording circuit, in the case of the initial recording since the Q-output of flip-flop 64 produces the logic "0" signal as shown in FIG. 10A-V, the output from the NAND gate 62 is always "1" irrespective of the information signal. Thus, the output of the AND gate 65 is "0". Further since the AND gate 63 is enabled by means of the logic "1" signal from the inverter 66, the information signal is transmitted through the AND gate 63 and appears at the output terminal 67 as it is as illustrated in FIG. 10A-VII. In case of the re-recording, since the Q-output of the flip-flop 64 is "1" as shown in FIG. 10B-V, the output of the AND gate 63 is "0". The information signal is inverted by the NAND gate 62 as illustrated in FIG. 10B-VI and the inverted signal is supplied to the output terminal 67 through the AND gate 65. In this manner at the output terminal 67 is produced the inverted information signal shown in FIG. 10B-VII. In order to record the re-recording information signal in the same manner as the initial recording information signal, the signals shown in FIGS. 10A-III and 10A-IV may be applied to the J- and K-inputs of the flip-flop 64, respectively.

Figure 11:
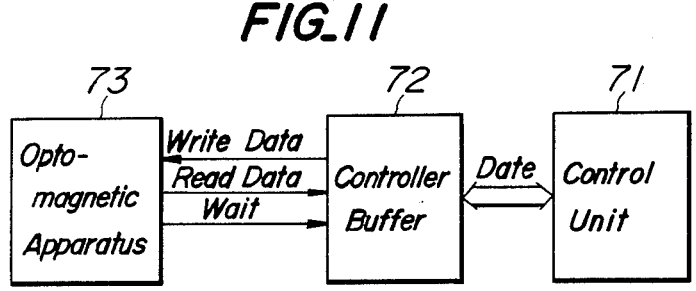
FIG. 11 is a block diagram showing a control system for recording according to the invention.

In the case of effecting the erasing and re-recording mentioned above an information signal having one track at the longest is supplied from a control unit 71 such as CPU to a controller buffer 72 as illustrated in FIG. 11 and is stored therein. Then after the erasing, the stored information signal is read out of the controller buffer 72 and is supplied to an opto-magnetic apparatus 73 as the re-recording signal. Alternatively, during the erasing, the write-in operation is inhibited and after the pick-up is returned to a start point of the erased track, the information signal is accepted and is recorded along the erased track.

As explained above in detail, according to the recording, reproducing and erasing method of the present invention, random access to any given track to be erased or recorded can be effected and even during the erasing and re-recording, the tracking error signal can be effectively obtained.

What is claimed is:

1. In a method of processing an information signal with respect to an opto-magnetic record medium which has an easily magnetizable axis perpendicular to its surface and has been uniformly magnetized in one direction, in order to erase an information signal which has been recorded in the record medium along one or more tracks by inverting the direction of magnetization in accordance with the information signal, the improvement in said method comprising:

heating at least a part of the track containing the information signal to be erased by uniformly irradiating said part with an unmodulated light beam to a temperature at which said part substantially attains a paramagnetic condition; and applying to said part an erasing magnetic field having a direction such that said part is uniformly magnetized in a direction opposite to said one direction so as to erase the information signal in said part of the track.

2. A method according to claim 1, wherein said erasing magnetic field is a demagnetizing field produced by adjacent portions surrounding said said part.

3. A method according to claim 1, wherein said erasing magnetic field is a superimposition of a demagnetizing field produced by adjacent portions surrounding said said part and an external magnetic field.

4. A method according to claim 1, wherein said light beam is a laser light beam.

5. A method according to claim 1 further comprising:
providing a signal indicating that said part is being erased;
providing a recording information signal to modulate said light beam; and
inhibiting the modulation of said light beam by said recording information signal in response to said erase indicating signal.

6. A method according to claim 1, further comprising:
storing the recording information signal to be recorded in a buffer memory having a storage capacity of one track, said recording information signal being supplied during the erasing; and
reading the recording information signal from the memory after erasing the track to record the recording information signal in the just erased track.

7. A method according to claim 1 further comprising the step of recording information in said erased part by:
providing a recording information signal represented by a signal polarity;
inverting said signal polarity to produce an inverted recording information signal;
modulating said light beam with said inverted recording information signal;
projecting said modulated light beam onto said erased part to heat portions thereof to said temperature; and
applying an external recording magnetic field having a direction such that said portions are magnetized in said one direction.

8. A method according to claim 7 further comprising the step of reproducing the recording information signal by:
projecting a polarized light beam along the track to rotate a polarization plane of said light beam in accordance with said recording information signal; and
detecting a rotational direction of said polarized light beam to reproduce said recording information signal.

9. A method according to claim 1 further comprising the step of recording information in said erased part by:
modulating said light beam with a recording information signal;
projecting said modulated light beam onto said erased part to heat portions in said erased part to said temperature; and
applying an external recording magnetic field having a direction such that said portions are magnetized in said one direction.

10. A method accordingly to claims 7 or 9 wherein said external recording magnetic flux is greater than a demagnetizing field produced adjacent to said erased part.

11. A method according to claim 9 further comprising the step of reproducing the recording information signal by:
projecting a polarized light beam along the track to rotate a polarization plane of said light beam in accordance with the recording information signal;
detecting a rotational direction of the polarized light beam to produce a signal having a polarity; and
inverting said polarity of said signal to reproduce the recording information signal.

12. A method according to claim 9, wherein said recording information signal is recorded together with an identifying signal representing that the recording information signal is recorded as magnetization having the same direction as that of the magnetization in surrounding portions of the record medium.

13. A method according to claim 12, wherein said identifying signal is formed by an indentifying field followed by a recording information signal field.

14. A method according to claim 12, wherein said identifying signal is inserted in a file index denoting the track number.

15. A method of providing detectable recording tracks for information signal recording in an opto-magnetic record medium comprising:
   selecting an opto-magnetic record medium having an easily magnetizable axis perpendicular to its surface and uniformly magnetized in one direction;
   uniformly heating a portion of said record medium with an unmodulated light beam to a temperature at which said portion attains a substantially paramagnetic condition; and
   applying a magnetic field to said portion in such a direction that said portion is uniformly magnetized in a direction opposite to said one direction to form a recording track.

16. The method of claim 11 further comprising the step of recording information in said track by:
   supplying a recording information signal;
   modulating a light beam with said information signal;
   projecting said modulated light beam onto said track to heat portions of said track to said temperature; and
   applying a recording magnetic field having a direction such that the portions heated by said modulated light beam are magnetized in said one direction to store said recording information in said track.

* * * * *